United States Patent
Min et al.

(10) Patent No.: US 7,617,351 B2
(45) Date of Patent: Nov. 10, 2009

(54) SEMICONDUCTOR MEMORY DEVICE HAVING RAM AND ROM AREAS

(75) Inventors: Byung-Jun Min, Yongin-si (KR); Kang-Woon Lee, Seoul (KR); Han-Joo Lee, Seoul (KR); Byung-Gil Jeon, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 382 days.

(21) Appl. No.: 11/567,844

(22) Filed: Dec. 7, 2006

(65) Prior Publication Data

US 2008/0016306 A1    Jan. 17, 2008

(30) Foreign Application Priority Data

Jan. 9, 2006    (KR) .................. 10-2006-0002111

(51) Int. Cl.
G06F 12/00    (2006.01)

(52) U.S. Cl. .................... 711/100; 711/154

(58) Field of Classification Search .............. 711/103, 711/100, 105, 207, 102, 154; 365/233, 185.09, 365/225.5

See application file for complete search history.

(56) References Cited

U.S. PATENT DOCUMENTS

| | | | | |
|---|---|---|---|---|
| 5,566,303 A | * | 10/1996 | Tashiro et al. | 711/213 |
| 5,576,987 A | * | 11/1996 | Ihara et al. | 365/189.011 |
| 5,912,849 A | * | 6/1999 | Yasu et al. | 365/195 |
| 6,462,985 B2 | | 10/2002 | Hosono et al. | |
| 6,532,528 B1 | * | 3/2003 | Nishimoto et al. | 711/207 |
| 7,126,851 B2 | * | 10/2006 | Hosono et al. | 365/185.09 |
| 7,251,190 B2 | * | 7/2007 | Imamiya et al. | 365/233.1 |
| 7,362,644 B2 | * | 4/2008 | Yang et al. | 365/225.5 |
| 2005/0262292 A1 | * | 11/2005 | Kozakai et al. | 711/103 |

* cited by examiner

*Primary Examiner*—Pierre-Michel Bataille
(74) *Attorney, Agent, or Firm*—F. Chau & Assoc., LLC (57) ABSTRACT

A semiconductor memory having two different memory areas in one chip includes a memory cell array including a first variable memory area controlled to be accessible in at least first and second operation modes, and a second variable memory area controlled to be inaccessible in one of the first and second operation modes; and a memory control unit for storing area information discriminating between the first memory area and the second memory area and generating memory control signals for controlling access to the first memory area and the second memory area. One memory can be substituted for a memory combination including ROMs and RAMs in one chip.

18 Claims, 7 Drawing Sheets

SEMICONDUCTOR MEMORY DEVICE HAVING RAM AND ROM AREAS

CROSS-REFERENCE TO RELATED APPLICATION

This application claims the benefit of Korean Patent Application No. 10-2006-0002111, filed, Jan. 9, 2006, the disclosure of which is hereby incorporated herein by reference in its entirety.

BACKGROUND OF THE INVENTION

1. Technical Field

The present disclosure relates to a semiconductor memory device and, more particularly, to a semiconductor memory device having two different memory areas, such as a RAM area and a ROM area, in one chip.

2. Discussion of Related Art

As portable electronic devices become more widely used with the development of the information technology (IT) industry, there is an increasing demand for a nonvolatile memory device for use as a main memory for electronic devices and equipment, such as portable computers, cellular phones, and game machines, which have file storing and retrieving functions, or as a recording medium for recording voice or images. This kind of nonvolatile memory device has an advantage in that it does not lose stored information, even when the power is turned off. Examples of such a nonvolatile memory device include an electrically-erasable programmable read-only memory (EEPROM), a flash memory, a ferroelectric random access memory (FRAM), a phase change random access memory (PRAM), and a magnetic random access memory (MRAM).

In a modern portable terminal such as a cellular phone, a personal communications services (PCS) phone, or an international mobile telecommunication (IMT) phone, demands for additional functions such as data communication, telephone number database, schedule management, personal memo, broadcasting program reception, and moving picture/music playback, as well as basic voice communication are increasing. These demands increase the size of a control application program installed in the portable terminal.

Figure 1:
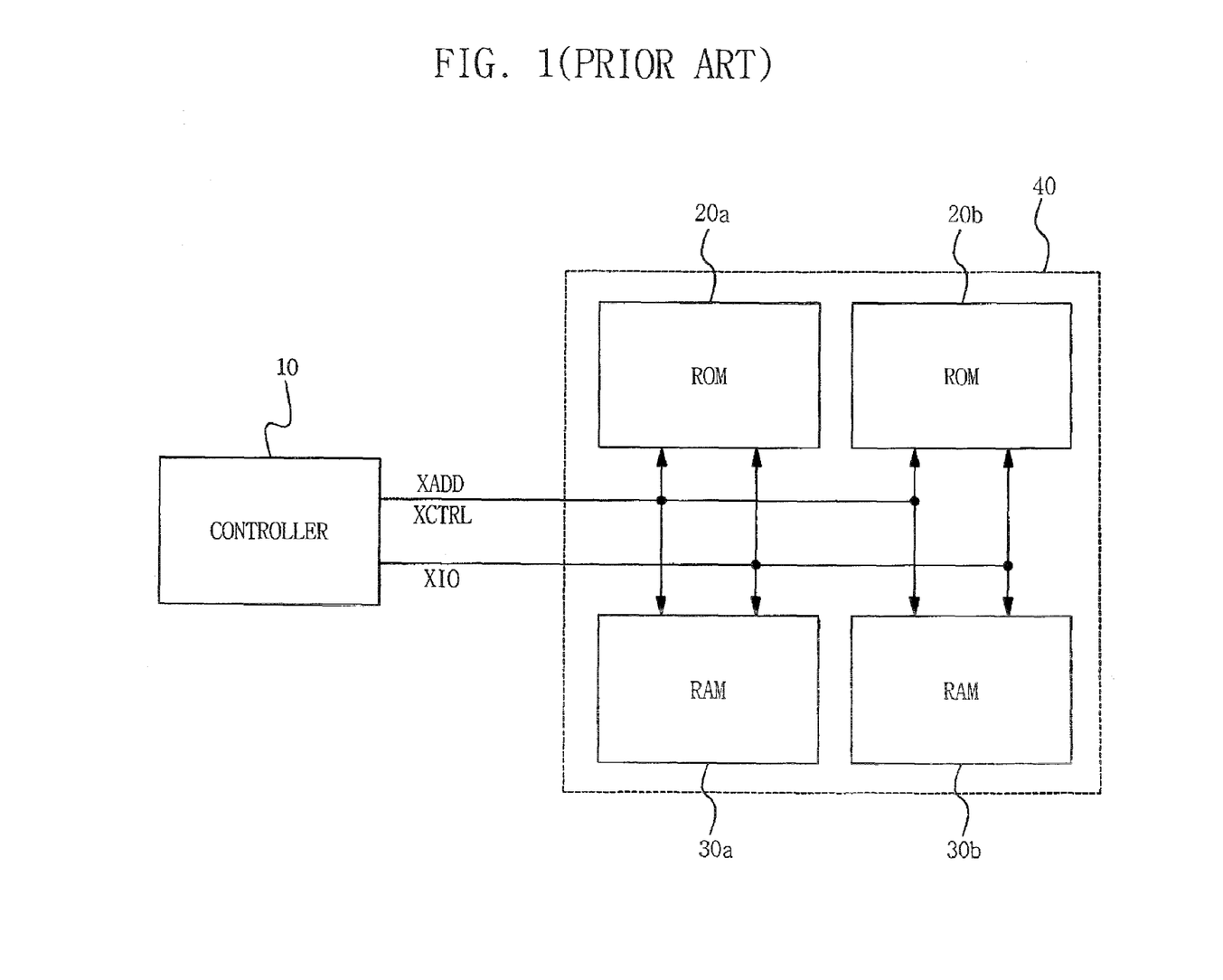
FIG. 1 is a block diagram illustrating a conventional system including ROMs and RAMs composed of a plurality of chips.

FIG. 1 is a schematic block diagram illustrating a system such as a portable terminal having several types of memories.

As shown in FIG. 1, in the portable terminal, memories may be generally divided into read only memories (ROMs) 20a and 20b storing a control program for controlling the operation and function of the portable terminal, and random access memories (RAMs) 30a and 30b for executing the control program.

The ROMs 20a and 20b and the RAMs 30a and 30b are controlled by a controller 10. For example, the controller 10 inputs an external address XADD, external data XIO, and a control signal XCTRL to the ROMs 20a and 20b and the RAMs 30a and 30b so that the data is written to a prescribed area. Further, when data is read from a prescribed area, the controller 10 applies the external address XADD and the control signal XCTRL and outputs read data to the exterior.

The ROMs can be electrically erasable programmable read-only memories (EEPROM) or flash memories and have a nonvolatile characteristic. Such ROM's, however, show low write operation speed and accordingly are mainly used for a read operation. The RAMs are cache memories supplementing the ROMs. For example, a static random access memory (SRAM) is widely used.

As the portable terminal having the above structure gets smaller, an occupying area available for the memories in the portable terminal is reduced. According to this trend, a multi-chip package (MCP) technique for packaging several chips as one entity has been developed. In FIG. 1, a memory combination 40, including the ROMs 20a and 20b and the RAMs 30a and 30b, generally has such an MCP structure.

When two or more memories are used, however, a structure of the memory combination gets complicated and such memories need to be separately driven. Accordingly, power consumption becomes significant and the cost increases. In addition, there is a difficulty in controlling several memory devices.

SUMMARY OF THE INVENTION

Exemplary embodiments of the present invention are directed to provide a semiconductor memory device capable of solving the aforementioned problems.

An exemplary embodiment of the present invention provides a semiconductor memory device having two different memory areas in one chip.

An exemplary embodiment of the present invention provides a semiconductor memory device having a memory structure in which one memory is substituted for a memory combination including ROMs and RAMs.

In accordance with an exemplary embodiment, the present invention provides a semiconductor memory device comprising: a memory cell array including a first variable memory area controlled to be accessible in at least first and second operation modes, and a second variable memory area controlled to be inaccessible in one of the first and second operation modes; and a memory control unit for storing area information discriminating between the first memory area and the second memory area and generating memory control signals for controlling access to the first memory area and the second memory area.

The first operation mode may be a read operation mode, and the second operation mode may be a write operation mode. The semiconductor memory device may allow generation of a first operation mode enable signal and a second operation mode enable signal in response to a first memory control signal from the memory control unit, and restrict generation of one of the first operation mode enable signal and the second operation mode enable signal in response to a second memory control signal from the memory control unit. The memory cell array may comprise a plurality of memory blocks, each including a plurality of memory cells.

The memory control unit may store area information of each of the memory blocks constituting the memory cell array, and discriminate between the first memory area and the second memory area by generating the first or second memory control signal corresponding to the area information of each memory block. The area information of each memory block may be set to an initial value when power is on, and may be changed to any value during operation. The area information of each memory block may be changed by a command register circuit. The command register circuit may generate change control signals for changing the area information of each memory block in response to a combination of a command address signal and/or a command data signal. An external operation control signal that restricts access to the first and second memory areas, at least in the first and second operation modes, may be applied while the command register circuit operates.

In accordance with an exemplary embodiment, the present invention provides a semiconductor memory device comprising: a memory cell array; and a memory control unit for generating memory control signals for dividing the memory cell array into a variable RAM area and a variable ROM area.

Both read and write operations on the RAM area may be allowed, and the read operation on the ROM area may be allowed but the write operation on the ROM area may be restricted. The semiconductor memory device may allow generation of a read enable signal and a write enable signal in response to a first memory control signal from the memory control unit, and the semiconductor memory device may allow generation of the read enable signal but restrict generation of the write enable signal in response to a second memory control signal from the memory control unit.

The memory cell array may comprise a plurality of memory blocks, each including a plurality of memory cells. The memory control unit may store area information of each of the memory blocks constituting the memory cell array, and discriminate between the first memory area and the second memory area by generating the first or second memory control signal corresponding to the area information of each memory block. The area information of each memory block may be set to an initial value when power is on, and may be changed to any value during operation. The area information of each memory block may be changed by a command register circuit.

The command register circuit may generate change control signals for changing the area information of each memory block in response to a combination of a command address signal and/or a command data signal. Write operation on the RAM area and the ROM area may be restricted by an external operation control signal while the command register circuit operates. The semiconductor memory device may be a non-volatile semiconductor memory device.

According to the above-described structure, the memory device can have a structure in which one memory can be substituted for a memory combination including ROMs and RAMs in one chip.

BRIEF DESCRIPTION OF THE DRAWINGS

Exemplary embodiments of the present invention will be understood in more detail from the following descriptions taken in conjunction with the attached drawings in which.

DETAILED DESCRIPTION OF EXEMPLARY EMBODIMENTS

The present invention will now be described more fully hereinafter with reference to the accompanying drawings, in which exemplary embodiments of the invention are shown. This invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art.

Figure 2:
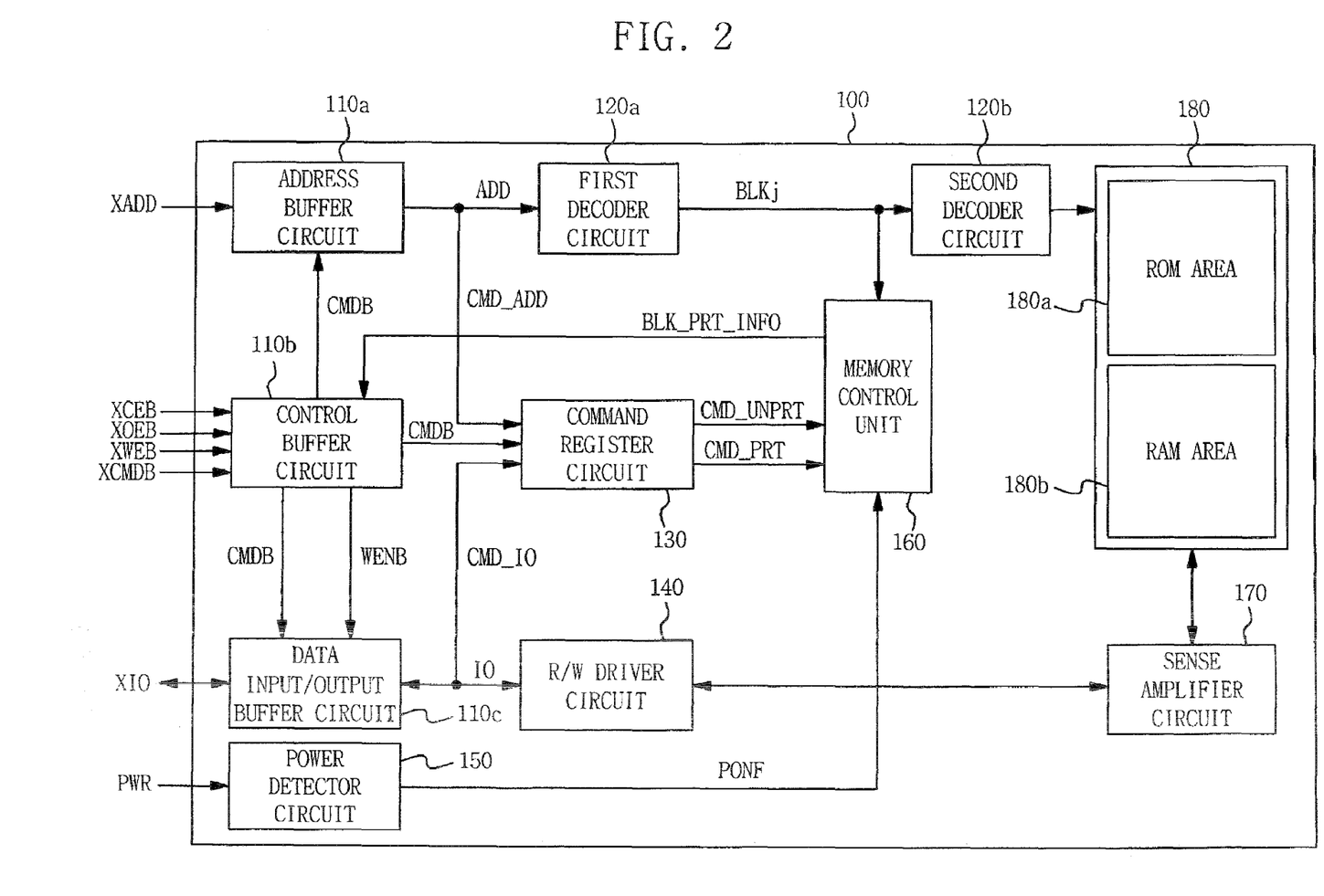
FIG. 2 is a block diagram illustrating a semiconductor memory device according to an exemplary embodiment of the present invention.

FIG. 2 is a block diagram illustrating a semiconductor memory device according to an exemplary embodiment of the present invention.

Referring to FIG. 2, a semiconductor memory device according to an exemplary embodiment of the present invention includes an address buffer circuit 110*a*, a control buffer circuit 110*b*, a data input/output buffer circuit 110*c*, a first decoder circuit 120*a*, a second decoder circuit 120*b*, a command register circuit 130, a read/write (R/W) driver circuit 140, a power detector circuit 150, a memory control unit 160, a sense amplifier circuit 170, and a memory cell array 180.

The address buffer circuit 130*a* buffers an external address signal XADD to generate and output internal, address signals ADD and CMD_ADD. The address buffer circuit 110*a* is divided into a normal address buffer circuit (not shown) and a command address buffer circuit (not shown). The normal address buffer circuit buffers the external address signal XADD to output the normal internal address signal ADD.

The normal internal address signal ADD refers to a generally used address signal, that is, an address signal for selecting a memory cell in a memory cell array. The command address buffer circuit buffers the external address signal XADD to output the command address signal CMD_ADD. The command address signal CMD_ADD refers to an address signal not for selecting a memory cell but for controlling the semiconductor memory device or performing other operations. The command address buffer circuit (not shown) may be controlled by an operation control signal CMDB that is a command signal. That is, the command address buffer circuit can operate only when the operation control signal CMDB is enabled and applied via the control buffer circuit 110*b*.

The control buffer circuit 110*b* buffers external control signals XCEB, XOEB, XWEB and XCMD to generate and output internal control signals CEB, OEB, WENB, and CMDB.

Among the internal control signals CEB, OEB, WENB and CMDB, the chip enable signal CEB is obtained by buffering an external chip enable signal XCEB and enables the semiconductor memory device or chip. An external read enable signal XOEB is a signal for initiating and notifying the read operation. Further, the write enable signal WENB is obtained by buffering an external write enable signal XWEB and is a control signal for initiating the write operation. The operation control signal CMDB is obtained by buffering an external operation control signal XCMDB and controls operation of the address buffer circuit 110*a* and the data input/output buffer circuit 110*c*, as well as the control buffer circuit 110*b* itself. For example, when the external address signal XADD or an external data signal XIO is input, the operation control signal CMDB controls the address buffer circuit 110*a* or the data input/output buffer circuit 110*c* to buffer the signal and output the command address signal CMD_ADD or a command data signal CMD_IO, respectively. Further, the operation control signal CMDB restricts the control buffer circuit 110*b* from generating the write enable signal WENB. That is, even though the external write enable signal XWEB is input, the control buffer circuit 110*b* does not generate the write enable signal WENB when the operation control signal CMDB is enabled. This prevents a specific memory cell from being selected based on the command external address signal and command data from being written to the selected memory cell.

In addition, the memory control signal BLK_PRT_INFO from the memory control unit 160 controls the control buffer circuit 110*b* to generate the internal control signals CEB, OEB, WENB and CMDB. For example, the memory control signal at a high level restricts generation of at least one, for example, the write enable signal WENB, of the internal control signals CEB, OEB, WENB, and CMDB. On the other hand, the memory control signal at a low level does not restrict the generation of all the internal control signals CEB, OEB, WENB, and CMDB.

The control buffer circuit 110b may include buffer circuits for independently buffering the respective control signals XCEB, XOEB, XWEB, and XCMD. Alternatively, the control buffer circuit 110b may include at least one buffer circuit for buffering the control signals XCEB, XOEB, XWEB, and XCMD.

The data input/output buffer circuit 110c buffers the external data XIO to generate and output internal data signals IO and CMD_IO. Furthermore, the data input/output buffer circuit 110c outputs a read data signal IO to the exterior. The data input/output buffer circuit 110c is divided into a normal data input/output buffer circuit (not shown) and a command data input/output buffer circuit (not shown).

The normal data input/output buffer circuit buffers the external data signal XIO and outputs a normal data signal IO, or outputs the read data signal IO to the exterior. The term normal data refers to generally used data, that is, data input to be written to a selected memory cell in the memory cell array or data stored in the memory cell and then read.

The command data input/output buffer circuit (not shown) buffers the external data XIO and generates and outputs a command data signal CMD_IO. The command data signal CMD_IO refers to a data signal that is intended to be written to the memory cell but for controlling the semiconductor memory device or performing other operations. The command data input/output buffer circuit (not shown) may be controlled by the operation control signal CMDB that is a command signal. That is, the command data input/output buffer circuit may operate only when the operation control signal CMDB is enabled and applied via the control buffer circuit 110b.

The first decoder circuit 120a decodes the internal address signal ADD received from the address buffer circuit 110a. That is, the first decoder circuit 120a outputs a memory block select signal BLKj for selecting one of the memory blocks in the memory cell array in response to the internal address signal ADD. The memory cell array 180 includes a plurality of memory blocks (not shown), and each memory block includes a plurality of memory cells (not shown).

The second decoder circuit 120b outputs a signal for selecting one of the plurality of memory cells in the block selected in response to the memory block select signal BLKj. The first decoder circuit 120a and the second decoder circuit 120b may be composed as one decoder circuit. Each of the first decoder circuit 120a and the second decoder circuit 120b may be divided into a row decoder circuit and a column decoder circuit. The first decoder circuit 120a and the second decoder circuit 120b may be a predecoder and a main decoder for a typical semiconductor memory device.

The command register circuit 130 is provided to change the memory area information that is stored in the memory control unit 160. It is assumed that the memory cell array 180 includes a plurality of memory blocks and each memory block includes a plurality of memory cells. In this case, the command register circuit 130 operates when memory blocks storing area information of a first memory area, for example, the RAM area, need to store area information of a second memory area, for example, the ROM area, or vice versa.

The command register circuit 130 continuously combines the command address signal CMD_ADD received from the address buffer circuit 110a and/or the command data signal CMD_IO received from the data input/output buffer circuit 110c to thereby generate or enable change control signals CMD_UNPRT and CMD_PRT for use by the memory control, unit 160 in changing area information of each memory block. The external write enable signal XWEB may be used as a clock for discriminating between cycles. The change control signals CMD_UNPRT and CMD_PRT output from the command register circuit 130 are input to the memory control unit 160 in order to change the area information. For example, when one specific memory block of a plurality of memory blocks belonging to the first memory area, for example, the RAM area, is to be changed into the second memory area, for example, tire ROM area, the area information of the specific memory block needs to be changed. Among the change control signals, the first change control signal CMD_PRT is enabled to change the area information of the specific memory block in the memory control unit 160. When the second memory area is to be changed into the first memory area, the second change control signal CMD_UNPRT is enabled to change the area information of the specific memory block of the memory control unit 160.

The operation control signal CMDB is enabled while the command register circuit 130 operates. Accordingly, even though the external write enable signal XWEB, which is used as a clock signal for the command register circuit 130, is input, the control buffer circuit 110b does not generate the write enable signal WENB. Accordingly, the write operation responsive to the external write enable signal XWEB used as the clock signal for the command register circuit 130 is not performed. The detailed operation of the command register circuit 130 will be described with reference to FIGS. 6 and 7.

Figure 6:
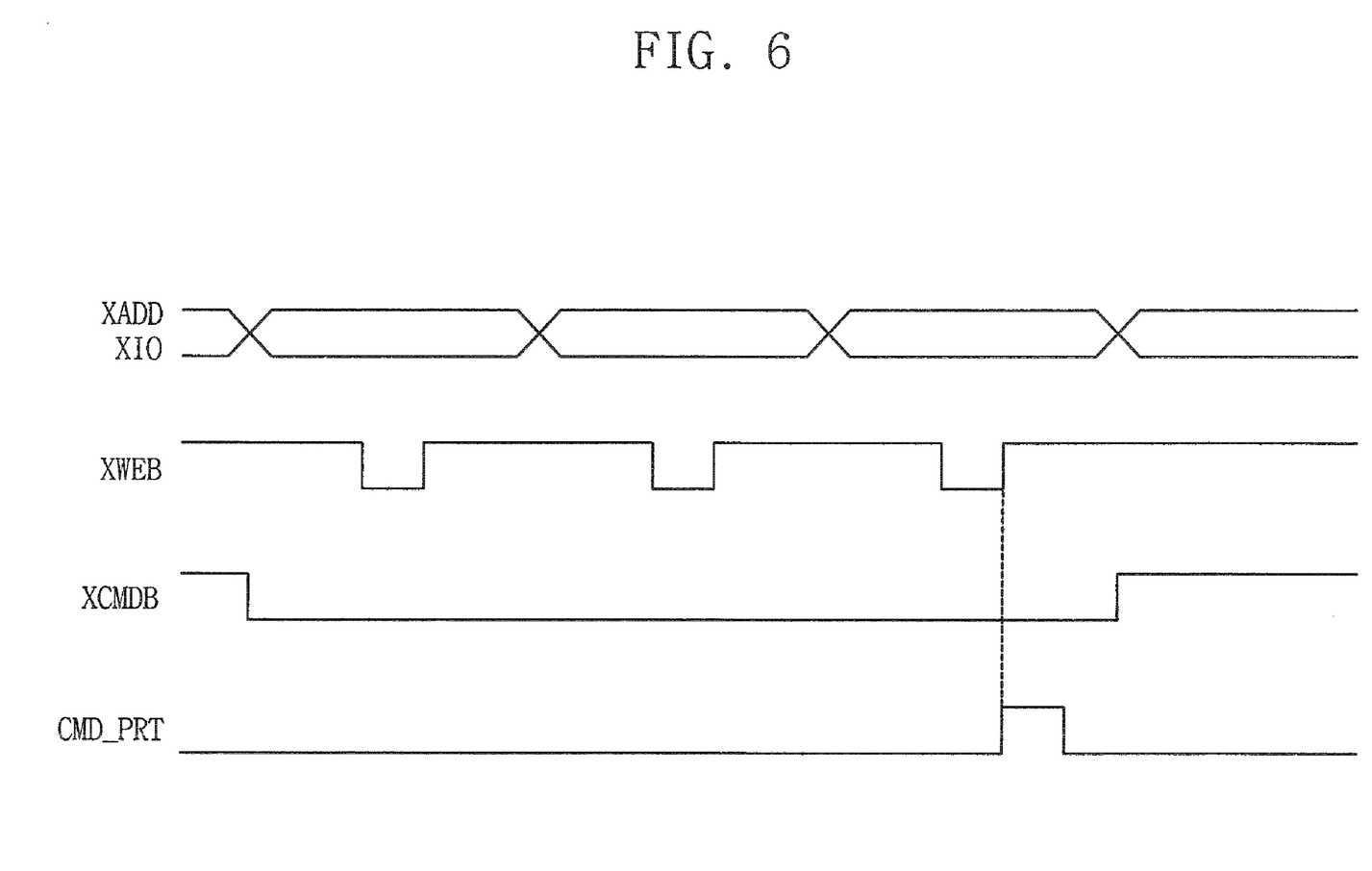
FIGS. 6 and 7 are timing diagrams of signals present in a command register circuit used in the device shown in FIG. 2.
Figure 7:
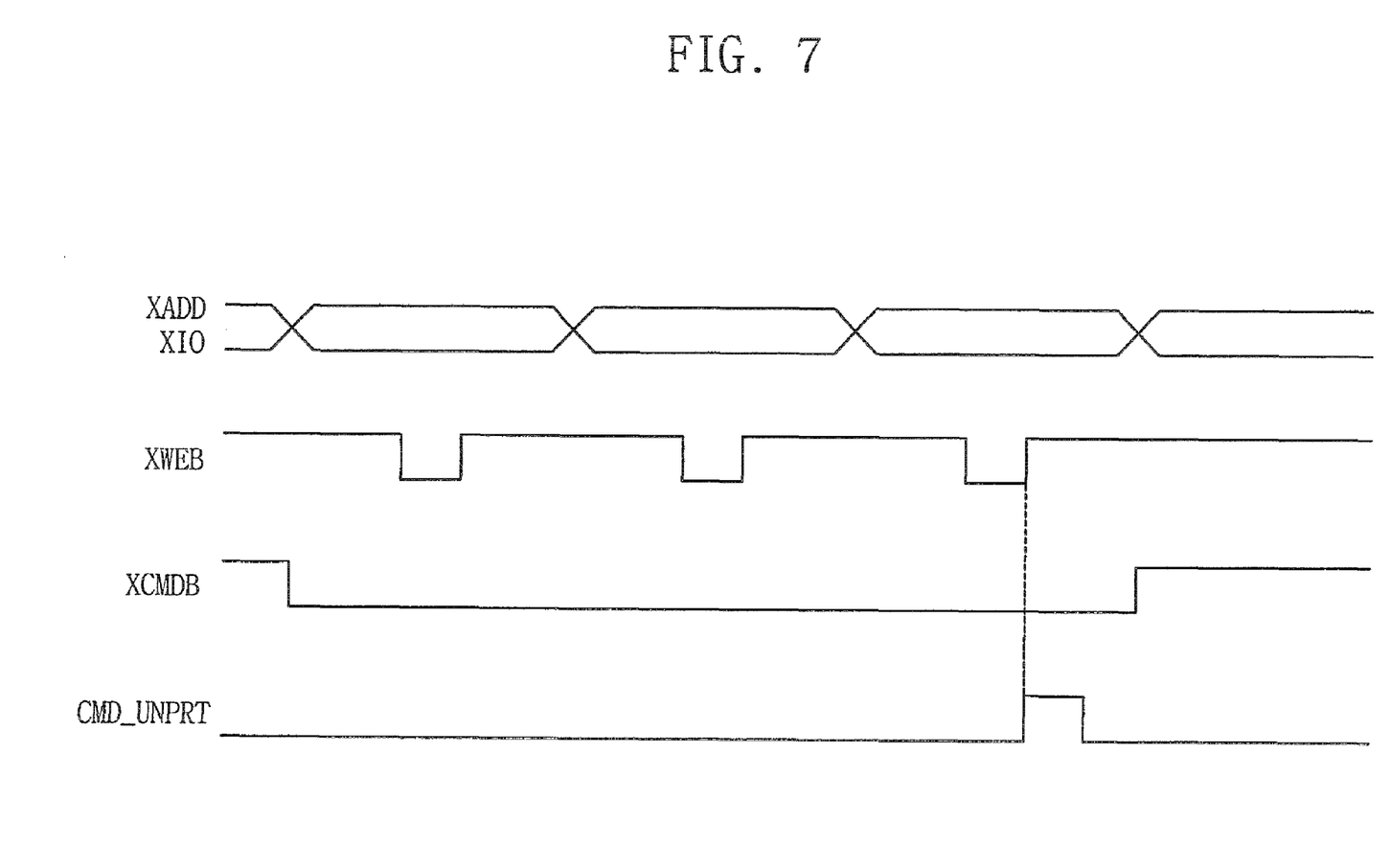

FIGS. 6 and 7 illustrate an example in which the change control signals CMD_PRT and CMD_UNPRT are generated or enabled in the command register circuit 130.

An example in which the command register circuit 130 enables or generates the change control signals CMD_PRT and CMD_UNPRT will be described with reference to FIGS. 6 and 7. First, it is assumed that the semiconductor memory device is set in advance so that, when the command address signal CMD_ADD and/or the command data signal CMD_IO are input at a preset value over three cycles, the command register circuit 130 is destined to enable or generate the change control signals CMD_PRT and CMD_UNPRT. For example, the generation of the change control signals CMD_PRT and CMD_UNPRT may be controlled using a combination of the command data signals CMD_IO that are input over three cycles irrespective of the command address signal CMD_ADD. The generation of the change control signals CMD_PRT and CMD_UNPRT may be controlled according to the states of the command data signal CMD_IO and the command address signal CMD_ADD. That is, the change control signals CMD_PRT and CMD_UNPRT may be obtained by a combination of a different address signal CMD_ADD and/or a data signal CMD_IO. The change control signals CMD_PRT and CMD_UNPRT are not obtained by the combination of the same address signal CMD_ADD and data signal CMD_IO over three cycles. The generation is changed according to settings made by the user. Controlling the generation of the change control signals CMD_PRT and CMD_UNPRT according to a preset value is for preventing a recognition error and malfunction of performing a typical write or read operation.

The external write enable signal XWEB is used as the clock for discriminating between cycles. When the semiconductor memory device is an asynchronous memory device, a control signal or another signal may be used as the clock for discriminating between cycles. The external write enable signal XWEB, however, is used herein. When the semiconductor memory device is a synchronous memory device, an external clock signal or a control signal may be normally used as the clock for discriminating between cycles.

The command address signal CMD_ADD and/or the command data signal CMD_IO are input at a preset value over three cycles, so that the change control signals CMD_PRT and CMD_UNPRT are generated or enabled. That is, the command address signal CMD_ADD and/or command data signal CMD_IO are input at a preset value while the external write enable signal XWEB is input continuously three times. The command register circuit 130 combines the command address signal CMD_ADD and/or the command data signal CMD_IO to generate or enable the first change control signal CMD_PRT as shown in FIG. 6, or to generate or enable the second change control signal CMD_UNPRT, as shown in FIG. 7. Of course, the command address signal CMD_ADD and the command data signal CMD_IO input to generate or enable the first change control signal CMD_PRT have different values from the command address signal CMD_ADD and the command data signal CMD_IO input to generate or enable the second change control signal CMD_UNPRT. For example, the first change control signal CMD_PRT and the second change control signal CMD_UNPRT are formed by a combination, with the same data signal CMD_IO to the second cycle, and it may be determined whether the first change control signal CMD_PRT or the second change control, signal CMD_UNPRT is generated or enabled according to a state of the address signal CMD_ADD in the third last cycle.

An external operation control signal XCMDB is input and enabled to prevent malfunction of the command register circuit 130. Even though the external write enable signal XWEB is input, the control buffer circuit 110b does not generate the write enable signal WENB.

Referring again to FIG. 2, the memory control unit 160 stores area information discriminating between the first memory area, for example, RAM area 180b, and the second memory area, for example ROM area 180a, in the memory cell array 180, and generates memory control signals BLK_PRT_INFO fed to the control buffer circuit 110b for controlling access to the first memory area and the second memory area. The memory control signals BLK_PRT_INFO may include a first memory control signal at a high level and a second memory control signal at a low level. While the memory control signals are represented as a plurality of ones for convenience of understanding, they may be a one pulse signal at a high or low level. The memory control signals will be herein represented as one signal. The example and operation of the memory control unit 160 will be described later with reference to FIGS. 3 to 5.

The R/W driver circuit 140 is provided for the data read or write operation. The R/W driver circuit 140 drives the data input from the sense amplifier 170 so that it is stably transferred to the data input/output buffer circuit 110c. The R/W driver circuit 140 also drives external data input via the data input/output buffer circuit 110c so that the external data is stably transferred and the write operation is possible.

The power detector circuit 150 detects a state of power to generate a power detection signal PONF. For example, the power detector circuit 150 generates the power detection signal PONF at a high level in a power-on state, where the power is at a certain level, and generates the power detection signal PONF at a low level in a power-off state. The power detection signal PONF is applied to the memory control unit 160 to initialize the area information in the memory control unit 160.

In the read operation, the sense amplifier circuit 170 senses and amplifies data developed at a specific memory cell in the memory cell array 180 and sends it to the R/W driver circuit 140. Further, in the write operation, the sense amplifier circuit 170 amplifies external data, input thereto via the R/W driver circuit 140, so that a stable write operation is performed. The sense amplifier circuit 170 is widely used in general semiconductor memory devices, and an example and operation of the sense amplifier circuit 170 are well known to those skilled in the art.

The memory cell array 180 includes a plurality of memory blocks. Each memory block includes a plurality of memory cells. In this exemplary embodiment the memory cell array 180 is divided into the first memory area 180b (RAM) and the second memory area 180a (ROM). The first memory area 180b can be accessed at least in a first operation mode, for example, the read operation mode, and a second operation mode, for example, the write operation mode. Access to the second memory area 180a is restricted in one of the first operation mode and the second operation mode. For example, the read operation on the second memory area 180a is allowed but the write operation is restricted. The memory cell array 180 may include memory blocks constituting the first memory area 180b, and memory blocks constituting the second memory area 180b.

The first memory area 180b and the second memory area 180a are determined by the area information of each memory block stored in the memory control unit 160. A configuration for the determination is not added to the memory cell array 180. In other words, the memory cell array 180 has the same structure as a memory cell array of a typical semiconductor memory device.

Figure 3:
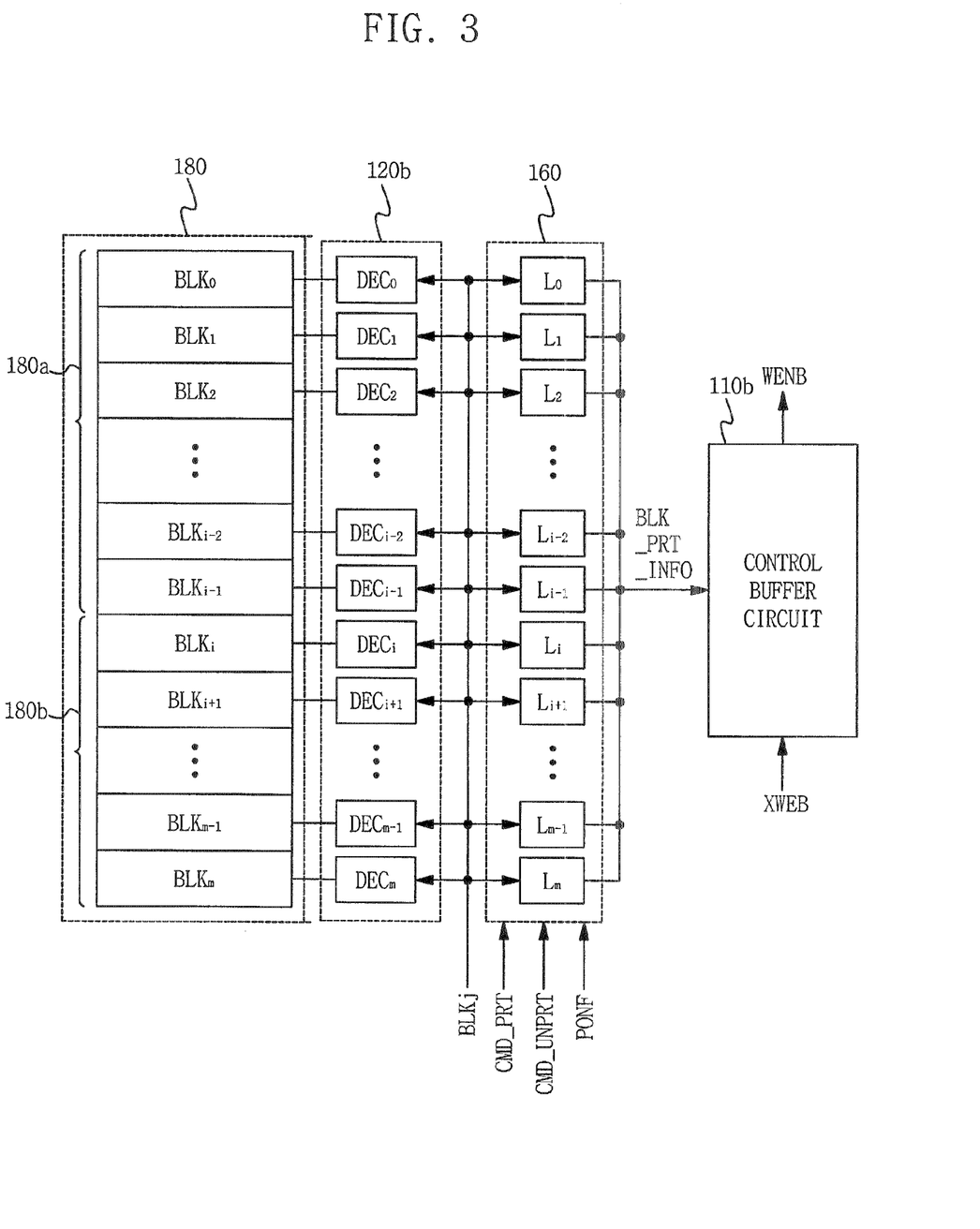
FIG. 3 is a block diagram illustrating a memory cell array, a second decoder circuit, and a memory control unit used in the device shown in FIG. 2.

FIG. 3 is a detailed block diagram illustrating the structure and operation of the memory cell array 180, the second decoder circuit 120b, and the memory control unit 160 of FIG. 2 according to an exemplary embodiment of the present invention.

Referring to FIG. 3, the memory cell array 180 includes a plurality of memory blocks $BLK_0$ to $BLK_m$. Each of the memory blocks $BLK_0$ to $BLK_m$ includes a plurality of memory cells.

The second decoder circuit 120b includes a plurality of decoding blocks $DEC_0$ to $DEC_m$ corresponding to the memory blocks $BLK_0$ to $BLK_m$. Each of the decoding blocks $DEC_0$ to $DEC_m$ is connected to a corresponding one of the memory blocks $BLK_0$ to $BLK_m$. For example, the i-th memory block $BLK_i$ of the memory blocks $BLK_0$ to $BLK_m$ is connected to the i-th decoding block $DEC_i$ of the decoding blocks $DEC_0$ to $DEC_m$.

Each of the decoding blocks $DEC_0$ to $DEC_m$ outputs a signal for selecting one of a plurality of memory cells in the corresponding memory block in response to the memory block select signal BLKj.

The memory control unit 160 further includes a plurality of memory control blocks $L_0$ to $L_m$ corresponding to the corresponding memory blocks $BLK_0$ to $BLK_m$. Each of the memory control, blocks $L_0$ to $L_m$ stores area information of a corresponding memory block of the memory blocks $BLK_0$ to $BLK_m$ and outputs it as a memory control signal BLK_PRT_INFO to control the control buffer circuit 110b. For example, the i-th memory control block $L_i$ of the plurality of memory control blocks $L_0$ to $L_m$ stores area information of the i-th memory block BLKi and outputs it as the memory control signal BLK_PRT_INFO. Accordingly, it is determined whether the i-th memory block $BLK_i$ is the first memory area or the second memory area depending on a state of the memory control signal BLK_PRT_INFO for the i-th memory block $BLK_i$.

Each of the memory control blocks $L_0$ to $L_m$ generates the memory control signal BLK_PRT_INFO for a specific memory block in response to the memory block select signal $BLK_j$. When the memory control block receives the change control signals CMD_PRT and CMD_UNPRT from the command register circuit 130, it changes and stores area information of the selected specific memory block in response to the change control signals CMD_PRT and CMD_UNPRT, and then outputs the memory control, signal BLK_PRT_INFO based on the changed information. Each of the memory control blocks $L_0$ to $L_m$ is set to an initial value by the power detection signal PONF. That is, when the power is off and then on, each memory control block stores area information dependent on a preset initial value, and thereafter, when the area information is changed, the memory control block operates according to the changed information. When the power is again off and then on, the memory control block returns to its initial value.

Figure 4:
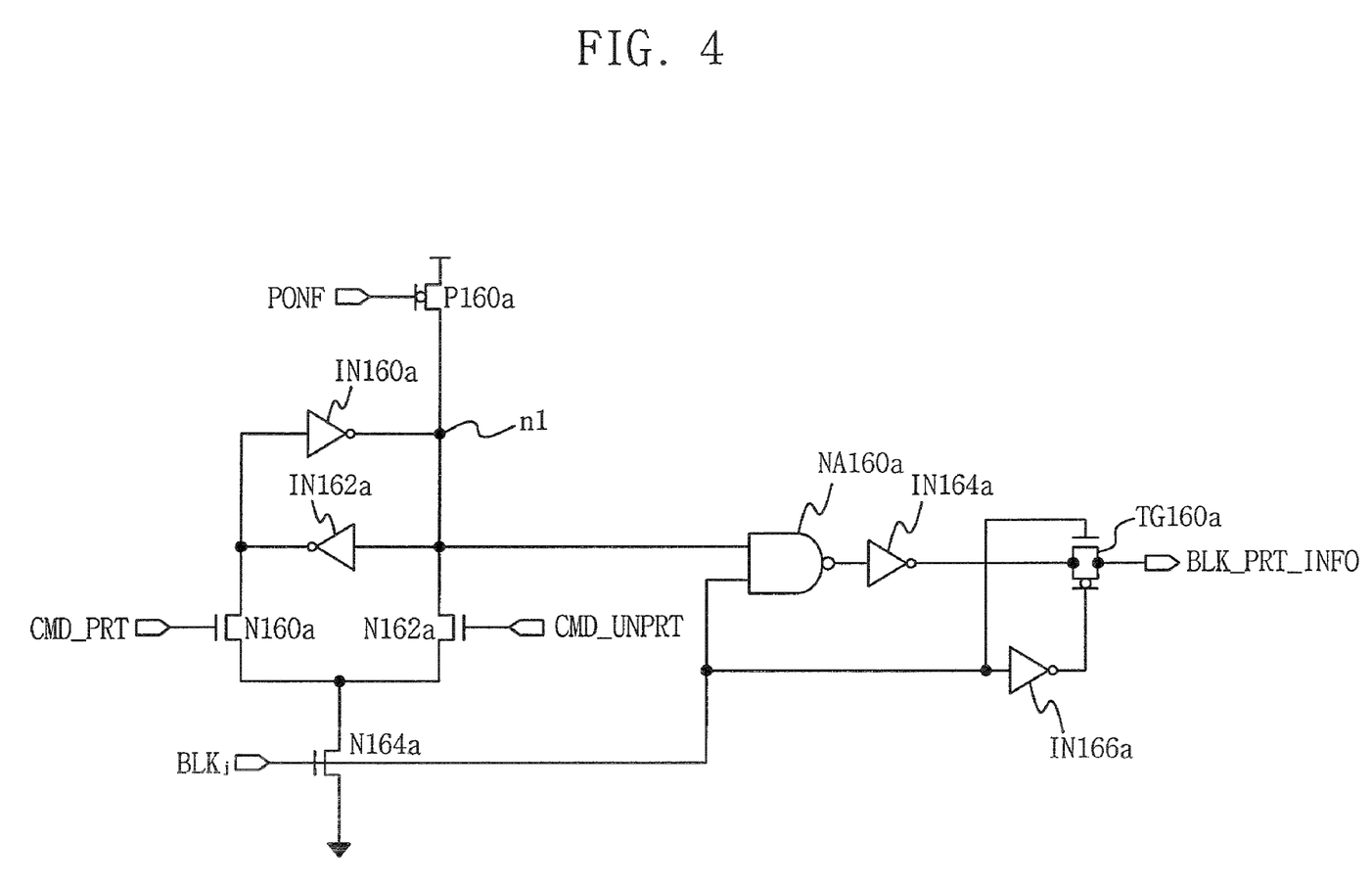
FIGS. 4 and 5 are circuit diagrams of memory control blocks constituting the memory control unit shown in FIG. 3.
Figure 5:
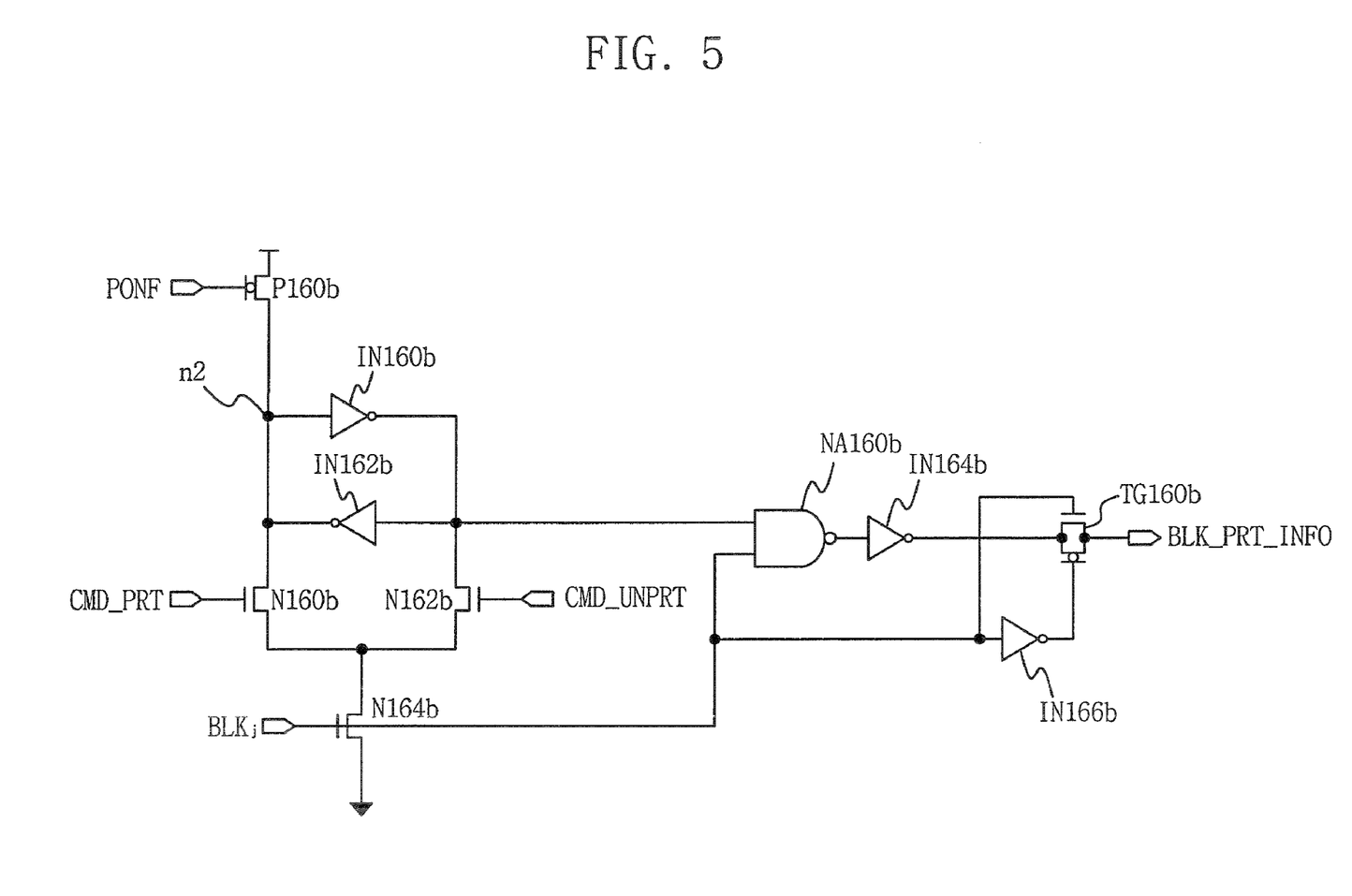

It is assumed that the initial value for discriminating between the first memory area 180b and the second memory area 180a in the memory cell array 180 is as follows. That is, it is assumed that, among the memory blocks $BLK_0$ to $BLK_m$, the i-th memory block $BLK_i$ to the m-th memory block $BLK_m$ are set as the first memory area 180b, and the 0-th memory block $BLK_0$ to the (i-1)-th memory block $BLK_{i-1}$ are set as the second memory area 180a. In this case, each of the memory control blocks $L_i$ to $L_m$ corresponding to the first memory area 180b may have a circuit structure as shown in FIG. 5, and each of the memory control blocks $L_0$ to $L_{i-1}$ corresponding to the second memory area 180a may have a circuit structure as shown in FIG. 4. That is, the memory cell array 180 is determined as the first memory area 180b or the second memory area 180a depending on whether each of memory control blocks $L_0$ to $L_m$ corresponding to the memory blocks $BLK_0$ to $BLK_m$ has the circuit structure as shown in FIG. 4 or the circuit structure as shown in FIG. 5. The circuit structure will be described with reference to FIGS. 4 and 5.

FIG. 4 illustrates an example of each of the memory control blocks $L_0$ to $L_{i-1}$ corresponding to the second memory area, for example, the ROM area.

Each of tire memory control blocks $L_0$ to $L_{i-1}$ corresponding to the second memory area 180a includes inverters IN160a, IN162a, IN164a and IN166a, a NAND circuit NA160a, a PMOS transistor P160a, NMOS transistors N160a, N162a, and N164a, and a transmission gate TG160a, as shown in FIG. 4.

Each of the memory control blocks $L_0$ to $L_{i-1}$ corresponding to the second memory area 180a operates as follows:

In a power-off state, the PMOS transistor P160a is turned on and a first node n1 is kept at a high level. The first node n1 is latched at a high level by a latch circuit including inverters IN160a and IN162a. In this state, when the power is on, a level state of the memory control signal BLK_PRT_INFO is determined based on a level state of the first node n1 and a level state of the memory block select signal $BLK_j$. That is, when the first node n1 is kept at a high level and the memory block select signal $BLK_j$ is enabled into a high level, the memory control signal BLK_PRT-INFO is output at a high level. The memory control signal BLK_PRT-INFO restricts the control buffer circuit 110b generating the write enable signal WENB. Accordingly, access to the second memory area 180a in the write operation is restricted. In this state, the change control signals CMD_PRT and CMD_UNPRT are disabled at a low level.

An example of performing the write operation on the memory blocks $BLK_0$ to $BLK_{i-1}$ constituting the second memory area 180a or changing some memory blocks to the first memory area 180b will now be described.

First, a memory block select signal $BLK_j$ for a memory block to be changed is enabled into a high level while the first node n1 is kept at a high level. This turns the NMOS transistor N164a on. Among the change control signals CMD_PRT and CMD_UNPRT, the second change control signal CMD_UNPRT is enabled into a high level by the command register circuit 130. This also turns the NMOS transistor N162a on. As the NMOS transistors N162a and N164a are turned on, the first node n1 is changed from a high level to a low level.

As the first node n1 is changed from a high level to a low level, the memory control signal BLK_PRT_INFO is changed to a low level and output. The memory control signal BLK_PRT-INFO at a low level does not restrict the control buffer circuit 110b generating the write enable signal WENB. Accordingly, the memory block is changed from the second memory area 180a to the first memory area 180b.

Thereafter, the first node n1 is kept at a low level until the first change control signal CMD_PRT among the change control signals CMD_PRT and CMD_UNPRT is enabled or the power is off. When the power is off, the PMOS transistor P160a is turned on and the first node n1 returns to a high level as the power is on.

FIG. 5 illustrates an example of each of the memory control blocks $L_i$ to $L_m$ corresponding to the first memory area, for example, the RAM area.

Each of the memory control blocks $L_i$ to $L_m$ corresponding to the first memory area 180b includes inverters IN160b, IN162b, IN164b, and IN166b, a NAND circuit NA160b, a PMOS transistor P160b, NMOS transistors N160b, N162b, and N164b, and a transmission gate TG160b, as shown in FIG. 5.

Each of the memory control blocks $L_i$ to $L_m$ corresponding to the first memory area 180b operates as follows:

In a power-off state, the PMOS transistor P160b is turned off and accordingly a second node n2 is kept at a high level. This is because the second node n2 is latched at a high level by a latch circuit including inverters IN160b and IN162b, In this state, when the power is on, a level state of the memory control signal BLK_PRT_INFO is determined based on a level state of the second node n2 and a level state of the memory block select signal $BLK_j$. That is, when the second node n2 is kept at a high level and the memory block select signal $BLK_j$ is enabled to a high level, the memory control signal BLK_PRT-INFO is output at a low level. The memory control signal BLK_PRT-INFO does not restrict the control buffer circuit 110b generating the write enable signal WENB. In addition, it does not restrict generation of any control signal. Accordingly, access to the memory blocks constituting the first memory area 180b is not restricted so that the read and write operation is freely performed. In this state, the change control signals CMD_PRT and CMD_UNPRT are disabled into a low level.

An example in which some of the memory blocks $BLK_i$ to $BLK_m$ is changed from the first memory area 180b to the second memory area 180a will now be described.

First, a memory block select signal $BLK_j$ for a memory block to be changed is enabled into a high level while the second node n2 is kept at a high level. This tarns the NMOS transistor N164b on. Among the change control signals CMD_PRT and CMD_UNPRT, the first change control signal CMD_PRT is enabled into a high level by the command register circuit 130. This also turns the NMOS transistor N160b on. As the NMOS transistors N160b and N164b are tamed on, the second node n2 is changed from a high level to a low level.

As the second node n2 is changed from a high level to a low level, the memory control signal BLK_PRT_INFO is changed to a high level and output. The memory control signal BLK_PRT-INFO at a high level restricts the control buffer circuit 110b generating the write enable signal WENB. Accordingly, the memory block is changed from the first memory area 180b to the second memory area 180a.

Thereafter, the second node n2 is kept at a low level until the second change control signal CMD_UNPRT among the change control signals CMD_PRT and CMD_UNPRT is enabled or the power is off. When the power is off, the PMOS transistor P160b is turned on and the second node n2 returns to a high level as the power is on.

As described above, in the semiconductor memory device according to an exemplary embodiment of the present invention, the memory cell array 180 may be divided into the first memory area 180b and the second memory area 180a. The division into the first memory area 180b and the second memory area 180a is made by the memory control unit 160, which stores area information of each memory block of the plurality of memory blocks constituting the memory cell array 180 and generates the memory control signal. When any one of the memory blocks is to be changed from the first memory area 180b to the second memory area 180a or from the second memory area 180a to the first memory area 180b, the command register circuit 130 generates the change control signals CMD_PRT and CMD_UNPRT.

While the exemplary embodiment of the present invention has been described with respect to the FRAM, it will be apparent to those skilled in the art that the present invention may be applied to other nonvolatile semiconductor memory devices.

As described above, according to an exemplary embodiment of the present invention, it is possible to implement a semiconductor memory device having two different memory areas on one chip without using an MCP technique of packaging several chips. That is, there is an advantage that one memory can be substituted for a memory combination including ROMs and RAMs. It is also possible to implement a semiconductor memory device having a simpler structure, compared to a semiconductor memory device including two or more conventional memories, and to reduce a burden of separately driving two memories. In addition, the RAM area and the ROM area can be switched to and from each other, thereby increasing efficiency.

Meanwhile, although the invention has been described using exemplary embodiments, it is to be understood that the scope of the invention is not limited to the disclosed exemplary embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements. For example, it will be apparent that an internal structure of the circuit may be changed or equivalent elements may be used instead of the elements of the circuit.

What is claimed is:

1. A semiconductor memory device comprising:
a memory cell array including a first variable memory area controlled to be accessible in at least first and second operation modes, and a second variable memory area controlled to be inaccessible in one of the first and second operation modes; and
a memory control unit for storing area information discriminating between the first memory area and the second memory area, and including a first memory control block generating a first memory control signal for converting at least a portion of the first variable memory area to be operable only in the second operation mode, and a second memory control block generating a second memory control signal for converting at least a portion of the second variable memory area to be operable in the first and second operation modes.

2. The device according to claim 1, wherein the first operation mode is a read operation mode, and the second operation mode is a write operation mode.

3. The device according to claim 1, wherein the memory cell array comprises a plurality of memory blocks, each including a plurality of memory cells.

4. The device according to claim 3, wherein the memory control unit stores area information of each of the memory blocks constituting the memory cell array, and discriminates between the first memory area and the second memory area by generating the first or second memory control signal corresponding to the area information of each memory block.

5. The device according to claim 4, wherein the area information of each memory block is set to an initial value when power is on, and is changed to another value during an operation mode.

6. The device according to claim 5, wherein the area information of each memory block is changed by a command register circuit connected to the memory control circuit.

7. The device according to claim 6, wherein the command register circuit generates change control signals for changing the area information of each memory block in response to a combination of a command address signal and/or a command data signal.

8. The device according to claim 7, wherein an external operation control signal restricting access to the first and second memory areas at least in the first and second operation modes is applied while the command register circuit operates.

9. The device according to claim 1, wherein the semiconductor memory device is a nonvolatile semiconductor memory device.

10. A semiconductor memory device comprising:
a memory cell array; and
a memory control unit for generating memory control signals for dividing the memory cell array into a variable RAM area and a variable ROM area and including a first memory control block generating a first memory control signal for converting at least a portion of the variable RAM area into the variable ROM area and a second memory control block generating a second memory control signal for converting at least a portion of the variable ROM area into the RAM area.

11. The device according to claim 10, wherein both read and write operations on the RAM area are allowed, and the read operation on the ROM area is allowed but the write operation on the ROM area is restricted.

12. The device according to claim 10, wherein the memory cell array comprises a plurality of memory blocks, each including a plurality of memory cells.

13. The device according to claim 12, wherein the memory control unit stores area information of each of the memory blocks constituting the memory cell array, and discriminates between the first memory area and the second memory area by generating the first or second memory control signal corresponding to the area information of each memory block.

14. The device according to claim 13, wherein the area information of each memory block is set to an initial value when power is on, and is changed to another value during an operation mode.

15. The device according to claim 14, wherein the area information of each memory block is changed by a command register circuit connected to the memory control unit.

16. The device according to claim 15, wherein the command register circuit generates change control signals for changing the area information of each memory block in response to a combination of a command address signal and/or a command data signal.

17. The device according to claim 16, wherein a write operation on the RAM area and the ROM area is restricted by an external operation control signal while the command register circuit operates.

18. The device according to claim 10, wherein the semiconductor memory device is a nonvolatile semiconductor memory device.

* * * * *